Patented Nov. 17, 1953

2,659,749

UNITED STATES PATENT OFFICE 2,659,749

PROCESS FOR PREPARING DIACYL CYANIDES

Lawrence F. Arnold, Avon Lake, Ohio, assignor to The B. F. Goodrich Company, New York, N. Y., a corporation of New York No Drawing. Application May 7, 1952, Serial No. 286,609

6 Claims. (Cl. 260—465.4)

This invention relates to an improvement in the catalytic reaction of carboxylic anhydrides with hydrogen cyanide to give diacyl cyanides, and pertains particularly to the use of a picoline catalyst in carrying out the reaction.

Diacyl cyanides and particularly di-(acetyl cyanide), also known as 1-acetoxy-1,1-dicyano ethane have become of considerable industrial importance because of the fact that they can be pyrolyzed to give monomeric vinylidene cyanide or its homologs which in turn are of great value in the preparation of synthetic resins particularly useful in making excellent filaments and films. The pyrolysis of 1-acetoxy-1,1-dicyano ethane to give monomeric vinylidene cyanide is described in U. S. Patent 2,476,270.

In a copending application, Serial No. 124,244, filed October 28, 1949, now Patent No. 2,623,062, it is disclosed that acetic anhydride and hydrogen cyanide react in the liquid phase in the presence of a basic catalyst to give 1-acetoxy-1,1-dicyano ethane. Among the basic catalysts disclosed as being useful are both organic and inorganic substances; for example, tertiary amines such as trimethyl amine, triethyl amine, tributyl amine, hexamethylene tetramine, pyridine, and the like, alkali metal salts of organic monocarboxylic acids such as sodium acetate, sodium propionate, sodium butyrate, potassium acetate and the like, secondary amines such as dimethyl amine, diethyl amine, di-isopropyl amine and the like, and other organic and inorganic bases including sodium hydroxide, potassium hydroxide, ammonium hydroxide, quaternary ammonium bases and the like.

The process of the copending application results in the obtainment of good yields of 1-acetoxy-1,1-dicyano ethane. However, the use of the basic catalysts disclosed in said copending application also results in the production of large quantities of a tarry residue which, in addition to lowering somewhat the yield of the desired diacyl cyanide, is most difficult to remove from the reaction system and consequently causes clogging, results in poor heat transfer and cuts down greatly the time during which the process may be operated without shutdowns for removal of the residue and cleaning of the reaction equipment.

Accordingly, it is an object of this invention to provide a more efficient and economical process for the reaction of acetic anhydride, as well as other carboxylic acid anhydrides, with hydrogen cyanide to give diacyl cyanides.

A more particular object is to provide materials which will catalyze the liquid phase reaction of carboxylic acid anhydrides with hydrogen cyanide to give high yields of diacyl cyanides with minimum formation of undesirable tarry residues. Other objects will be apparent from the description of the invention which follows.

It has now been discovered that the above and other objects are readily accomplished by reacting carboxylic acid anhydrides with hydrogen cyanide in the presence of a catalytic quantity of a picoline, that is, a methylpyridine. By carrying out the reaction in this manner excellent yields of high purity diacyl cyanide are obtained while the quantity of tarry residue formed is much smaller than when other basic materials are used as catalysts, and in fact is for all practical purposes negligible.

The reaction of carboxylic acid anhydrides with hydrogen cyanide in the presence of a catalytic quantity of picoline, proceeds as follows:

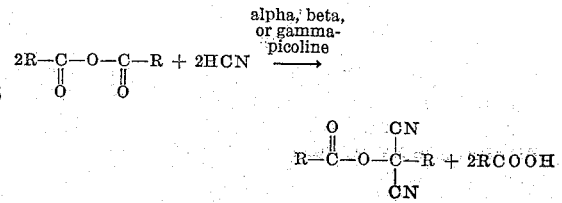

wherein each R represents a hydrocarbon radical.

The carboxylic acid anhydrides which are reacted with hydrogen cyanide in accordance with the present invention include both the aliphatic alicyclic and aromatic monocarboxylic acid anhydrides, such as acetic anhydride, propionic anhydride, butyric anhydride, isobutyric anhydride, n-caprylic anhydride, stearic anhydride, hexahydrobenzoic anhydride, phenylacetic anhydride, benzoic anhydride, toluic anhydrides, naphthoic anhydrides and the like. Mixed carboxylic acid anhydrides may also be utilized. The especially preferred anhydrides for use in the present process are those in which the radical R in the above equation is an alkyl radical containing from 1 to 6 carbon atoms.

The temperature at which the reaction is carried out is not critical and may be varied within wide limits. However, when utilizing acetic anhydride in a liquid phase reaction, at temperatures above about 100° C. acetamide and diacetamide are likely to be formed and the yields of the desired diacyl cyanide may be somewhat reduced. Accordingly, it is particularly desirable for liquid phase reaction to utilize reaction temperatures below about 100° C. and preferably in the range of from 10° C. to 70° C. Temperatures below about 10° C. may also be successfully utilized; in fact, excellent yields of diacyl cyanides can be obtained at temperatures as low as —70° C. or even lower, although the use of low temperatures requires considerably longer reaction times.

As will be seen from the foregoing reaction equation, two moles of the carboxylic acid anhydride and two moles of hydrogen cyanide are required stoichiometrically for the reaction to take place. However, a stoichiometric excess of either of the two reactants may also be utilized; in fact, optimum yields of the desired product are obtained when an excess of the carboxylic acid anhydride, for example, about 1.2 to 4 moles for each mole of hydrogen cyanide, is present.

The catalyst which is utilized in carrying out the improved process of the present invention may be any of the three known picolines, alpha-picoline (2-methyl-pyridine) of the structure

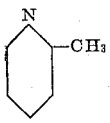

beta-picoline (3-methyl-pyridine) of the structure

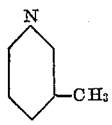

or gamma-picoline (4-methyl-pyridine) of the structure

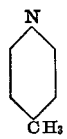

Each of the three isomeric forms of picoline is a liquid which is soluble in liquid carboxylic acid anhydrides and therefore can be conveniently utilized simply by dissolving it in the anhydride prior to the reaction of the anhydride with hydrogen cyanide. The use of gamma-picoline results in the obtainment of highest yields of diacyl cyanides with the lowest quantity of residue and consequently the gamma form is especially preferred for use in the present process although it is to be understood that the alpha and beta forms may also be utilized with good results. Mixtures of the picolines may also be employed. The amount of catalyst used is not a critical factor and may be varied considerably. In general, however, from 0.1% to 5% of catalyst, based on the total weight of the reactants, is employed.

The reaction itself may be carried out in a number of different ways. For example, one method consists in first dissolving the catalyst in the liquid carboxylic acid anhydride and then bubbling gaseous hydrogen cyanide into this mixture while maintaining the desired reaction temperature by the use of external cooling means, which is necessary since the reaction tends to be exothermic. This method of carrying out the reaction is desirable since with gradual addition of the hydrogen cyanide less heat is evolved and temperature control is facilitated. This procedure is by no means a critical expedient, however, and if desired the entire amounts of both reactants and catalyst may be mixed together at the same time. Another preferred method of carrying out the reaction involves first admixing the carboxylic acid anhydride, hydrogen cyanide and catalyst in a closed reaction vessel and then forcing the mixture under pressure through a tube maintained at the desired reaction temperature and wherein the reaction takes place. This method is particularly desirable since only a very short time, for example, about 20 to 30 minutes, is required to obtain very high yields of diacyl cyanide. The reaction may also be carried out in the presence of inert solvents or diluents such as benzene, nitrobenzene, dioxane, and the like.

When the reaction is complete, which is generally evidenced by cessation of heat evolution, the catalyst is preferably neutralized with an acidic material and the diacyl cyanide is recovered from the reaction mixture, which also may contain some unreacted hydrogen cyanide and carboxylic acid anhydride, by a simple distillation, preferably at reduced pressures or by other conventional separation methods.

The following examples are intended to illustrate more fully the practice of the invention, but are not to be construed as a limitation upon the scope thereof, for there are, of course, numerous possible variations and modifications.

*Examples I to XVII*

1-acetoxy-1,1-dicyano ethane is prepared by reacting acetic anhydride with hydrogen cyanide in the liquid phase, in the presence of various basic catalysts, including picoline, utilizing varying temperatures and molar ratios of reactants. The pertinent data, including the yield of 1-acetoxy-1,1-dicyano ethane and the per cent residue based on the quantity of 1-acetoxy-1,1-dicyano ethane obtained are recorded in the following table:

| Example | Catalyst | Charge Catalyst | (Moles) AC₂O | HCN | Reaction Time, Hrs. | Temperature, °C. | Yield, Percent of Theory | Percent Residue |
|---|---|---|---|---|---|---|---|---|
| I | gamma picoline | 0.01 | 3.5 | 1 | 72 | 40 | 92.5 | 5.8 |
| II | do | 0.01 | 3.5 | 1 | 96 | 35 | 97 | 3.7 |
| III | do | 0.01 | 3.5 | 1 | 21.5 | 60 | 91.6 | 9.2 |
| IV | do | 0.008 | 1.6 | 0.722 | 0.5 | 100 | 91.3 | 7.4 |
| V | do | 0.006 | 3.4 | 1 | 14 | 100 | 91.3 | 7.4 |
| VI | do | 0.01 | 3.5 | 1 | 96 | 20 | 96 | 8.6 |
| VII | do | 0.01 | 3.5 | 1 | 100 | —70 | 97 | 3.7 |
| VIII | do | 0.01 | 2.0 | 1 | 96 | —70 | 90 | 5.5 |
| IX | beta picoline | 0.01 | 3.5 | 1 | 3 | 70 | 70 | 10 |
| X | potassium carbonate | 0.01 | 2.0 | 1 | 6 | 91 | 58 | 30 |
| XI | potassium cyanide | 0.01 | 2.0 | 1 | 6 | 60 | 59.8 | 50.5 |
| XII | triethyl amine | 0.02 | 2.0 | 1 | 3 | 70 | 58.4 | 39.2 |
| XIII | hexamethylene tetramine | 0.01 | 3.5 | 1 | 3 | 70 | 0 | 0 |
| XIV | potassium acetate | 0.01 | 3.5 | 1 | 2.5 | 70 to 85 | 58.1 | 38.2 |
| XV | dimethyl ethanolamine | 0.016 | 1.6 | 0.73 | 3.5 | 70 | 75.1 | 41.1 |
| XVI | 2,4-dimethyl pyridine | 0.008 | 1.6 | 0.74 | 3.5 | 70 | 51.9 | 18.4 |
| XVII | N,N-diethyl cyclohexyl amine | 0.01 | 1.8 | 0.558 | 3.0 | 100 | 61.3 | 79.1 |

When Examples I to IX are repeated substituting alpha-picoline for beta or gamma-picoline excellent results are again obtained.

The above examples demonstrate clearly that the picolines are greatly superior to other basic materials as catalysts for the liquid phase reaction of carboxylic acid anhydrides with hydrogen cyanide in that extremely high yields of diacyl cyanides and only very small quantities of residue are obtained when utilizing the improved process of the present invention.

In addition to being useful in the preparation of polymerizable monomeric materials the diacyl cyanides, prepared according to the method of this invention, are also useful for other purposes. For example, the diacyl cyanides possess insecticidal, fungicidal and herbicidal properties as well as being valuable intermediates in the preparation of other chemical products.

Although specific examples of the invention are included herein, it is not intended to limit the invention thereto, for numerous variations and modifications will be apparent to those skilled in the art, and are included within the scope of the appended claims.

I claim:

1. In the method which comprises bringing together a monocarboxylic acid anhydride and hydrogen cyanide in the presence of a basic catalyst whereupon chemical reaction occurs between said anhydride and the hydrogen cyanide to form a diacyl cyanide, the improvement which comprises carrying out the reaction in the liquid phase at a temperature of from about $-70°$ C. to about $100°$ C., in the presence of a catalyst consisting of a picoline.

2. In the method which comprises bringing together a carboxylic acid anhydride of the structure $(RCO)_2O$, wherein R is an alkyl radical, and hydrogen cyanide in the liquid phase and in the presence of a basic catalyst, whereupon chemical reaction occurs between the said anhydride and the hydrogen cyanide to form a diacyl cyanide of the structure

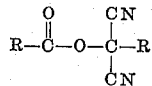

wherein each R has the same significance as above, the improvement which comprises carrying out the reaction at a temperature of from about $-70°$ C. to about $100°$ C. in the presence of a catalyst consisting of a picoline.

3. The method of claim 2 wherein the picoline is gamma-picoline.

4. In the method which comprises bringing together liquid acetic anhydride and hydrogen cyanide in the liquid phase and in the presence of a basic catalyst, whereupon chemical reaction occurs between said acetic anhydride and the hydrogen cyanide to form 1-acetoxy-1,1-dicyano ethane, the improvement which comprises carrying out the reaction at a temperature of from about $-70°$ C. to about $100°$ C. in the presence of a catalyst consisting of a picoline.

5. The method of claim 4 wherein the picoline catalyst is gamma-picoline.

6. In the method which comprises bringing together liquid acetic anhydride and hydrogen cyanide in the liquid phase and in the presence of a basic catalyst, the improvement which comprises carrying out the reaction in the presence of a catalyst consisting of from 0.01% to 5% by weight of gamma-picoline.

LAWRENCE F. ARNOLD.

References Cited in the file of this patent

UNITED STATES PATENTS

| Number | Name | Date |
|---|---|---|
| 2,596,804 | Ardis | May 13, 1952 |